US008743211B2

(12) United States Patent
Beazley

(10) Patent No.: US 8,743,211 B2
(45) Date of Patent: Jun. 3, 2014

(54) EFFICIENT TEST GENERATOR FOR VIDEO TEST PATTERNS

(75) Inventor: Todd Martin Beazley, Portland, OR (US)

(73) Assignee: GVBB Holdings S.A.R.L., Luxembourg (LU)

( * ) Notice: Subject to any disclaimer, the term of this patent is extended or adjusted under 35 U.S.C. 154(b) by 1259 days.

(21) Appl. No.: 11/990,533

(22) PCT Filed: Mar. 29, 2006

(86) PCT No.: PCT/US2006/011488
§ 371 (c)(1),
(2), (4) Date: Feb. 14, 2008

(87) PCT Pub. No.: WO2007/027199
PCT Pub. Date: Mar. 8, 2007

(65) Prior Publication Data
US 2009/0096872 A1    Apr. 16, 2009

Related U.S. Application Data

(60) Provisional application No. 60/712,952, filed on Aug. 31, 2005.

(51) Int. Cl.
*H04N 17/00* (2006.01)
(52) U.S. Cl.
USPC .............................. 348/181; 348/716; 348/718
(58) Field of Classification Search
USPC .................................. 348/181–183, 175–178
See application file for complete search history.

(56) References Cited

U.S. PATENT DOCUMENTS

| 4,149,178 | A |   | 4/1979 | Estes |
|---|---|---|---|---|
| 4,724,484 | A |   | 2/1988 | Ward |
| 5,122,863 | A |   | 6/1992 | Zortea |
| 5,136,368 | A | * | 8/1992 | Fairhurst ....................... 348/177 |
| 5,319,446 | A |   | 6/1994 | Emmoto et al. |
| 5,671,011 | A |   | 9/1997 | Kim |
| 5,781,231 | A |   | 7/1998 | Reynolds |

(Continued)

FOREIGN PATENT DOCUMENTS

| EP | 00014327 | 8/1980 |
|---|---|---|
| EP | 0105791 | 4/1984 |

(Continued)

OTHER PUBLICATIONS

European Patent Office, Supplementary European Search Report and Search Opinion for the European Patent Application No. 06739947.7, Completion of the search dated Jul. 21, 2011.

(Continued)

*Primary Examiner* — Benjamin R Bruckart
*Assistant Examiner* — Rong Le
(74) *Attorney, Agent, or Firm* — Arent Fox LLP

(57) ABSTRACT

A video test pattern generator and method include a control sequencer configured to control one or more address counters to generate a video test pattern. A first memory is configured to store pixel values for transitions between portions of the video test pattern and configured to store a repeated pixel value. A second memory is configured to store pattern information to determine placement of the pixel values for the transitions and the repeated pixel values. A repeat counter is configured to control a number of the repeated pixel values produced before a next transition.

21 Claims, 3 Drawing Sheets

(56) References Cited

U.S. PATENT DOCUMENTS

| | | | |
|---|---|---|---|
| 5,841,251 | A | 11/1998 | Vroemen et al. |
| 5,872,592 | A | 2/1999 | Manea et al. |
| 6,246,422 | B1 * | 6/2001 | Emberling et al. ............ 345/552 |
| 6,735,334 | B2 * | 5/2004 | Roberts ......................... 382/167 |
| 6,741,277 | B1 | 5/2004 | Rau |
| 7,061,540 | B2 * | 6/2006 | Weaver et al. ................. 348/500 |
| 2002/0140818 | A1 | 10/2002 | Rowe |
| 2004/0146287 | A1 | 7/2004 | Jeon |

FOREIGN PATENT DOCUMENTS

| | | | |
|---|---|---|---|
| EP | 0122124 A2 * | 10/1984 | ............... H04N 9/62 |
| EP | 0122124 A2 | 10/1984 | |
| JP | 1007895 | 1/1989 | |
| JP | 2201397 | 8/1990 | |
| JP | 2233085 | 9/1990 | |
| JP | 2256391 | 10/1990 | |
| JP | 6006838 | 4/1994 | |
| JP | 2004062068 | 2/2004 | |

OTHER PUBLICATIONS

Tichit, B. et al.: A compact camera-VTR system for electronic news gathering, Revue Technique Thomson-CSF, vol. 18, No. 2, Jun. 1986, pp. 349-384, France.

Rulsen, H.: Grid and Bar: Easy to Operate Test Generator for Video I, Funkschau, No. 13, Jun. 24, 1983, pp. 81-84, West Germany.

International Search Report, dated Mar. 5, 2008.

Anon: Automatic Pattern Generation for Self-testing Displays, IBM Technical Disclosure Bull v 29 n, Oct. 5, 1986, pp. 2080-2082.

Burrell, M.: Simple Colour Pattern Generator, Television, vol. 40, No. 4, published Feb. 1990, pp. 282-283, UK.

Miranda ARC-372p, Video Systems, Jan. 1, 2002, p. 78, www.miranda.com.

Ochiva, D.: Hotware; A Review of New Products, Millimeter, Apr. 1, 2004.

Rulsen, H.: Grid and Bar: Easy to Operate Test Generator for Video I, Funkschau, No. 13, Jun. 24, 1983, pp.. 81-84, West Germany.

Schulz, F.: Measuring Delays and Their Effects II, CED, vol. 13, No. 10, Oct. 1987, pp. 21-22, 24, 26 and 28, US.

\* cited by examiner

EFFICIENT TEST GENERATOR FOR VIDEO TEST PATTERNS

CROSS-REFERENCE TO RELATED APPLICATIONS

This application claims the benefit, under 35 U.S.C. §365 of International Application PCT/US2006/011488, filed Mar. 29, 2006, which was published in accordance with PCT Article 21(2) on Mar. 8, 2007, in English and which claims the benefit of U.S. provisional patent application No. 60/712,952, filed Aug. 31, 2005.

FIELD OF THE INVENTION

The present invention generally relates to test pattern generators and, more particularly, to an efficient test pattern generator that reduces the amount of memory storage needed to generate a test pattern in both standard and high definition screen test patterns.

BACKGROUND OF THE INVENTION

Typically, digital video test pattern generators store pixels for entire lines of video. For color bar patterns, there is much redundant data stored for solid color segments of a video line. The more complex the pattern, the more storage there must be to store all the video lines. This is further aggravated in high-definition video, in which there are more pixels per video line. For example, several kilobytes can be needed to store one line of video.

In the past, enough pixel memory was included in a generator to make up an entire line of video. For standard definition color bars, 1440 bytes of storage was needed for one video line (up to 3840 bytes are needed for high-definition video). As test pattern complexity increased, more video lines per pattern needed to be stored.

Therefore, a need exists for a more memory efficient test pattern generator for devices with display screens.

SUMMARY

A video test pattern generator and method include a control sequencer configured to control one or more address counters to generate a video test pattern. A first memory is configured to store pixel values for transitions between portions of the video test pattern and configured to store a repeated pixel value. A second memory is configured to store pattern information to determine placement of the pixel values for the transitions and the repeated pixel values. A repeat counter is configured to control a number of the repeated pixel values produced before a next transition. The first and second memories may be included in a same chip or disk.

BRIEF DESCRIPTION OF THE DRAWINGS

The advantages, nature, and various additional features of the invention will appear more fully upon consideration of the illustrative embodiments now to be described in detail in connection with accompanying drawings wherein.

It should be understood that the drawings are for purposes of illustrating the concepts of the invention and are not necessarily the only possible configuration for illustrating the invention.

DETAILED DESCRIPTION OF THE INVENTION

Aspects of the present invention provide systems and methods for reducing the amount of memory needed in storing pixel data for video test patterns, and in particular, vertical bar-type video test patterns. In one embodiment, pixel data is stored for transitions between bars, and the bars themselves are generated by repeating a last pixel of each transition for bar duration. For bar patterns, embodiments described herein greatly reduce the amount of pixel storage needed by storing only those pixels for the transitions between bars of different colors (a smooth transition between colors is needed rather than an abrupt switch, to prevent problems in downstream video processing).

Video test patterns are usually band-limited. The color values cannot simply step from one to the other. The colors need smooth transitions from one color bar to the next. Therefore, aspects of the present invention use pre-calculated pixels (using an appropriate low-pass filter) for each transition between bars, and store these transition pixels in ROM (read only memory). Also stored in ROM are the number of times the last pixels of each transition are repeated to make up the width of the color bar (rather than store the same pixel value hundreds of time for each bar).

It is to be understood that the present invention is described in terms of video test pattern generators; however, the present invention is much broader and may include any test generator having one or more fields with a repeating color or pattern. In addition, the present invention is applicable to any video display devices or video display generator devices including but not limited to television, set top boxes, DVRs, DVD or video cassette recorders, personal digital assistants, handheld computers, mobile telephones, personal computers or laptops, etc.

It should be understood that the elements shown in the FIGS. may be implemented in various forms of hardware, software or combinations thereof. Preferably, these elements are implemented in a combination of hardware and software on one or more appropriately programmed general-purpose devices, which may include a processor, memory and input/output interfaces.

In the following discussion, the following terms will be used to illustrate concepts of the present invention. For example, the expression 'test pattern' refers to an entire video image produced by the test pattern generator. The expression 'bar pattern' refers to one sequence of color bars included in one or more video lines making up a test pattern. The term 'transition' refers to the pixels (e.g., eight pixels) between two different color bars.

Figure 1:
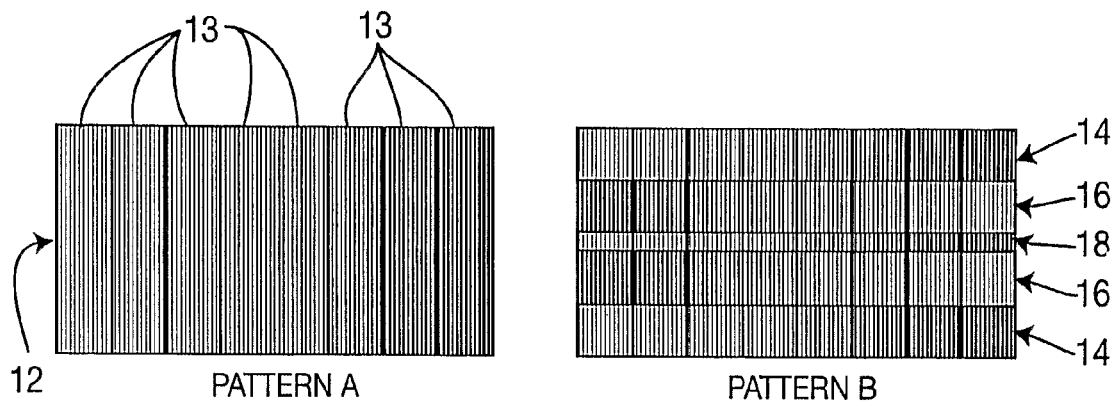
FIG. 1 is diagram showing exemplary video test patterns rendered in accordance with aspects of the present invention.

Referring now in specific detail to the drawings in which like reference numerals identify similar or identical elements throughout the several views, and initially to FIG. 1, exemplary color bar patterns are shown with gray scale shading for illustration purposes. Pattern A and pattern B are two examples of the types of test patterns that an implementation the present invention can generate. Test pattern A 12 uses one bar pattern using eight vertical bars 13, each of different color.

Test pattern B uses three different bar patterns 14, 16 and 18, with two of the bar patterns 14 and 16 repeated in the lower half of pattern B.

Figure 2:
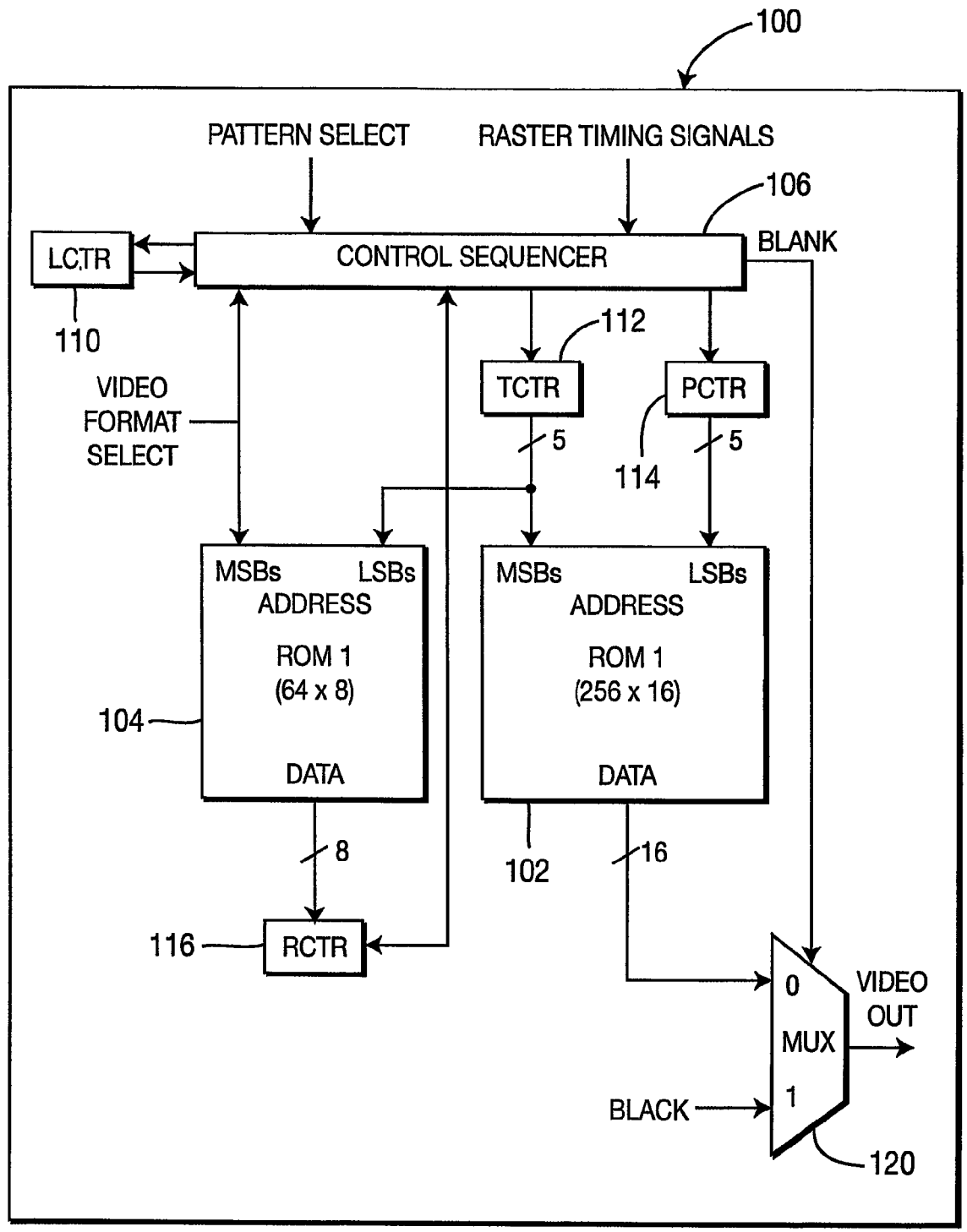
FIG. 2 is a block diagram of a test pattern generator in accordance with an illustrative embodiment of the present invention.

Referring to FIG. 2, a block diagram of an illustrative test pattern generator 100 is shown in accordance with one embodiment. Generator 100 may include a first read only memory (ROM1) 102, and a second ROM (ROM2) 104. A control sequencer 106 provides a processing function to determine what colors or patterns to generate. A plurality of counters, e.g., line counter (LCTR) 110, transition counter (TCTR) 112, pixel counter (PCTR) 114 and repeat counter (RCTR) 116 are employed to run through video line address and sections. In the embodiment shown, transition pixel data is stored in ROM 1 102 and repeat counts of pixel data are stored in ROM 2 104. A multiplexer 120 is employed to provide black pixels as a default when no test pattern is to be output (such as during horizontal and vertical retrace of the video raster).

With reference to the test patterns (A and B) in FIG. 1, the test patterns for two different video formats will be described (in this case, high-definition video in 1080i or 720p formats). Bar pattern 1 (12 and 14) is a simple 8-bar pattern with a total of nine transitions (the ninth transition is from the last bar color to black). Bar pattern 2 (16) is the same color bar pattern 1 in reverse order, and bar pattern 3 (18) is a 12-step grey scale from white to black. Other bar patterns may also be employed.

Figure 3:
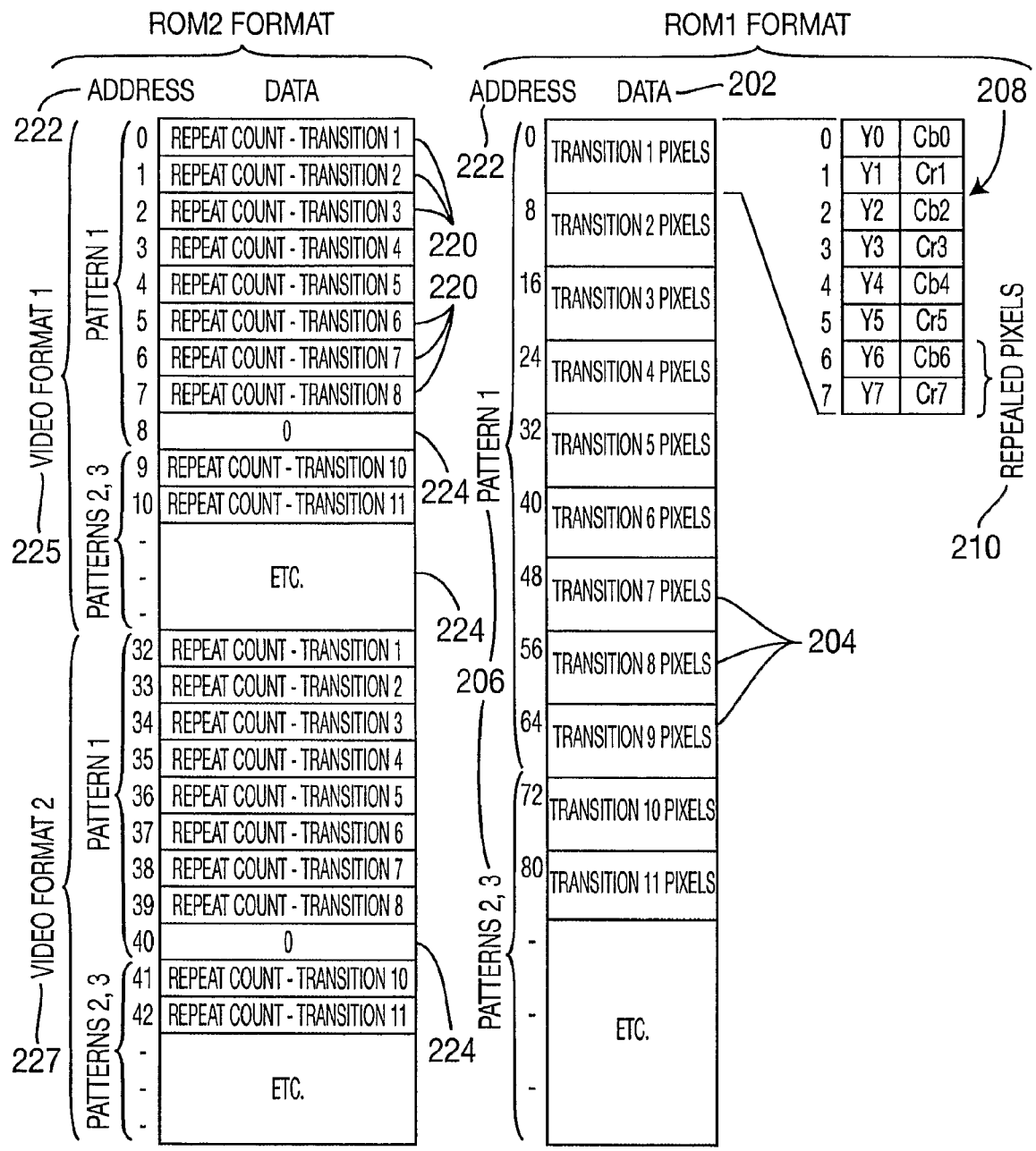
FIG. 3 is a block diagram showing contents of memory devices including pixel values and transition locations stored in illustrative read only memories in accordance with one embodiment of the present invention.

Referring to FIG. 3 with continued reference to FIG. 2, contents of ROM 1 102 and ROM2 104 are illustratively shown. ROM 1 102 includes pixel data 202 for all transitions 204 in all the bar patterns 1, 2, 3 (206). In this case, there are 8 pixels per transition (e.g., in 4:2:2 Y-Cb-Cr format) shown in block 208. In 4:2:2 Y-Cb-Cr format, the color difference samples (Cb and Cr) each occur at half the sample rate of the luma (Y) samples, which means that each pixel has one Y sample, and two consecutive pixels share one each of Cb and Cr samples. The last two pixels 210 of each group of eight are the bar color, and are the pixels that are repeated to make up the width of the bar.

ROM2 104 includes repeat count values for each color bar. Each location 220 in ROM2 104 corresponds to a group of 8 pixels in ROM 1 102. Because of this, the two ROMs 102 and 104 can share address bits 222 that select the color bar to produce. Since a last transition 224 of each bar pattern goes to horizontal blanking (black) instead of another bar color, the location in ROM2 104 corresponding to this last transition is unused and set to zero.

ROM2 104 includes the capability to process multiple video formats 225 and 227 (e.g., high-definition video in 1080i or 720p formats). The formats 225 or 227 may be selected based on the external logic, e.g., using a video format select signal. It should be understood that the test patterns, bar patterns and formats described and shown are for illustrative purposes. Other patterns and formats may also be employed and in larger numbers.

Referring again to FIG. 2, control sequencer 106 is used to sequence the bar patterns 12, 14, 16, 18, etc. (e.g., FIG. 1) for each of the test patterns, e.g., A and B (FIG. 1) that an implementation can produce. External logic (not shown) informs sequencer 106 which test pattern and video format to generate by inputting a pattern select signal. The external logic also provides the sequencer 106 with raster timing signals. The ROMs 102 and 104 are addressed by binary counters 112 and 114 under the control of the sequencer 106. Counter 114 may include a 3-bit up-counter that provides least-significant address bits to ROM1 102. For each color bar, counter 114 counts up from 0 through 7, then toggles between the 6 and 7counts for the duration of the bar. The 6 and 7 counts are the repeated pixel values. In this way, the address values change while maintaining the assigned pixel value to generate the solid colored bar or to provide a repeating pattern.

Counter 112 addresses both ROMs 102 and 104 to select a transition pixel sequence, and the repeat count. Counter 112 is loaded by the control sequencer 106 at the start of each bar pattern. At the beginning of each bar transition, counter 116 gets loaded with the ROM2 104 output, and counter 114 is reset to zero and then permitted to count up. When counter 114 starts repeating counts 6 and 7, counter 116 gets decremented for each repeat. When counter 116 reaches zero, counter 114 is reset to zero, counter 112 is incremented by one, and the next output of ROM2 104 is loaded into counter 116. This cycle repeats until the video line is complete.

Counter 110 includes a video line counter that counts down a number of lines that a bar pattern is repeated in (for example, test pattern A in FIG. 1 uses only one bar pattern that occupies all lines of the video field, while test pattern B has three different bar patterns (two of which are repeated in the lower half of the field). The control sequencer 106 loads a line count into counter 110 at the start of each bar pattern. As each video line is completed, counter 110 is decremented by one. When counter 110 reaches zero, the control sequencer 106 either terminates bar generation (if test pattern A), or advances to the next bar pattern (if test pattern B). Between video lines (during horizontal blanking) or between video fields, the sequencer 106 causes black video to be inserted into the output using multiplexer 120 which is enabled to output a black pixel values in accordance with a blank signal.

Advantageously, by reusing or repeating the same pixel values a large amount of pixel storage space is saved. For example, the storage area needed to define a test pattern for a majority of screen pixels is reduced to only a few memory locations. The test generator circuit, as described with reference to FIG. 2, may be incorporated into any video screen or device to provide an efficient test pattern generator for adjusting or other wise testing a video screen.

Figure 4:
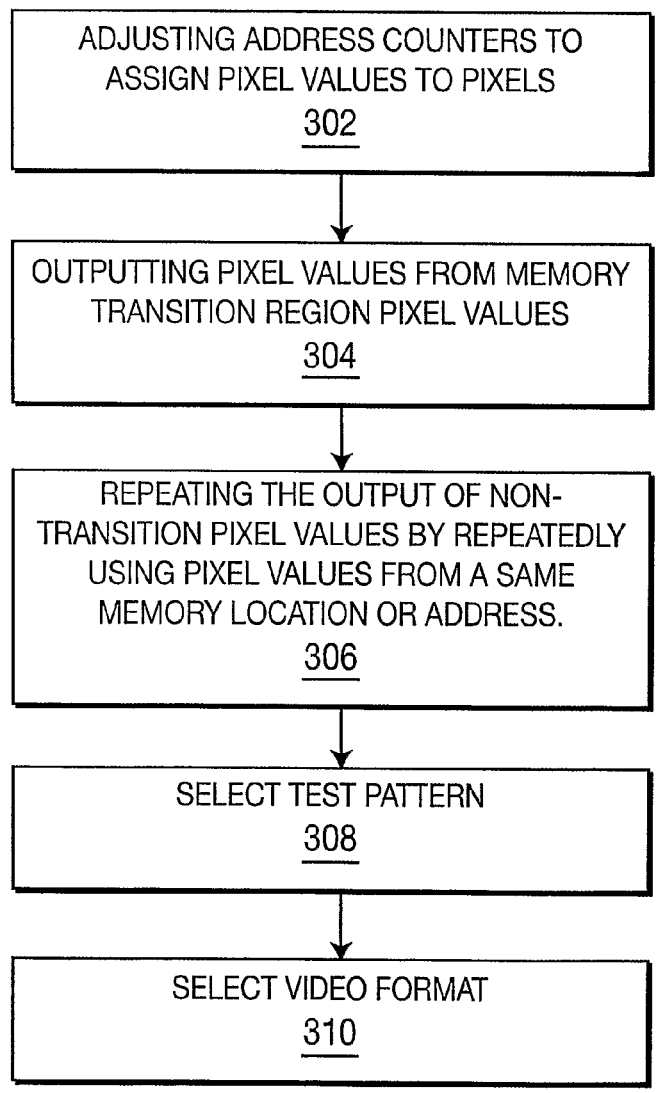
FIG. 4 is a flow diagram showing a method for efficiently generating a test pattern in accordance with an illustrative embodiment of the present invention.

Referring to FIG. 4, a block/flow diagram for efficiently generating a test pattern in accordance with illustrative embodiments is shown. In block 302, adjusting (incrementing or decrementing) address counters to assign pixel values to pixels is performed. This includes employing a control sequencer to set and increment and decrement counters. For example, counters include a pixel value counter that provides the pixel value addresses, a transition counter that provides when and where transitions are rendered, a repeat counter that stored a number of time a pixel value is repeated for non-transitional regions, and a line counter that adjusts the line being addressed.

In block 304, pixels values are output from memory for transition regions of a video test pattern in accordance with stored transition values. The transition pixels values may be stored in one memory and the pattern for rendering the transition pixel values stored in another memory. It is also possible to have all of the stored information stored in a single memory device.

In block 306, pixel values are repeated in regions other than the transition regions such that the repeated pixel values are repeatedly output from a same memory location. The pixel values for the solid color regions of FIG. 1 for example, are repeated from the same memory location. This obviates the need for storing a large number of pixel values that are the same.

In block 308, different patterns may be stored and rendered on the same screen or the patterns may be selected in accordance with an application or other criteria. Likewise, a video format may be selected for rendering. The patterns and formats may be based on user preferences, factory settings or may be responsive to the type of display. For example, video formats may change between high and standard definition televisions. Alternately, the formats may be different for say high definition televisions (e.g., high-definition 1080i or 720p).

Having described preferred embodiments for systems and methods for efficient test generator for video test patterns (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

The invention claimed is:

1. A video test pattern generator, comprising:
   a controller for controlling at least one address counter to generate a video test pattern;
   a first memory for storing pixel values for transitions between portions of the video test pattern and for storing a repeated pixel value and further wherein the transitions are transitions between bars in the video test pattern, wherein the first memory stores pixel values for transitions between bars of different colors in the video test pattern;
   a second memory for storing pattern information for rendering the pixel values and the repeated pixel values stored in the first memory, wherein each location in the second memory corresponds to a predetermined number of pixels in a group in the first memory to select the color bar to produce; and
   wherein the second memory determines a number of the repeated pixel values produced before a next transition.

2. The generator as recited in claim 1, wherein the controller is a control sequencer that controls at least one address counter such that at least the one address counter is incremented/decremented to change a pixel address for which a pixel value is assigned.

3. The generator as recited in claim 1, wherein the at least one address counter includes a pixel counter that provides pixel values for transitions in accordance with a Y-Cb-Cr format.

4. The generator as recited in claim 1, wherein the at least one address counter includes a transition counter which provides address locations for the pixel values for transitions.

5. The generator as recited in claim 1, wherein the counter is a repeat counter that includes a count that represents a number of times a pixel value is repeated before a next transition.

6. The generator as recited in claim 1, wherein the at least more address counter includes a line counter that changes a line count to apply pixel values to a next row of pixels.

7. The generator as recited in claim 1, wherein the first memory includes a read only memory having pixel transitions values stored in accordance with at least one pattern for the video test pattern.

8. The generator as recited in claim 7, wherein the second memory includes a read only memory having transitions location values which correspond with the addresses for pixel transition values in the first memory.

9. The generator as recited in claim 1, wherein the second memory includes stores transition patterns for at least one video format, and the video format is selectable.

10. The generator as recited in claim 1, further comprising means for generating black pixels.

11. A video test pattern generator, comprising:
    a control sequencer configured to control address counters including a pixel counter, a transition counter, a repeat counter and a line counter in accordance with a selected video test pattern;
    a first memory configured to store pixel values for transitions between portions of the video test pattern and configured to store a repeated pixel value, the first memory configured to output pixel values stored therein in accordance with address information from the transition counter and the pixel counter, wherein the pixel values are transition pixels that are pre-calculated and further wherein the transitions are transitions between bars in the video test pattern, wherein the first memory stores pixel values for transitions between bars of different colors in the video test pattern; and
    a second memory configured to store pattern information for rendering the pixel values for the transitions and the repeated pixel values stored in the first memory, the second memory configured to define transition regions and repeated pixel regions in accordance with address information from the transition counter and a selected format, wherein each location in the second memory corresponds to a predetermined number of pixels in a group in the first memory to select the color bar to produce;
    the line counter configured to change a line count to apply pixel values to a next row of pixels, and the repeat counter configured to control a number of the repeated pixel values produced before a next transition,
    wherein the first memory stores pixel values for transitions between bars of different colors in the video test pattern.

12. The generator as recited in claim 11, wherein the address counters are incremented/decremented to change addresses for which a pixel value and/or a transition is assigned.

13. The generator as recited in claim 11, wherein the pixel values are stored in accordance with a Y-Cb-Cr format.

14. The generator as recited in claim 11, wherein the first memory includes a read only memory having pixel transitions values stored in accordance with one or more patterns for the video test pattern.

15. The generator as recited in claim 14, wherein the second memory includes a read only memory having transitions location values stored therein which correspond with the addresses for pixel transition values in the first memory.

16. The generator as recited in claim 11, wherein the second memory includes stored transition patterns for one or more video formats, and the video formats are selectable.

17. The generator as recited in claim 11, further comprising means for generating black pixels.

18. A method for generating a video test pattern, comprising:
    adjusting address counters to assign pixel values to pixels;
    outputting pixels values from memory for transition regions of a video test pattern in accordance with stored transition values, the stored transition values being stored in a first memory and pattern information for rendering the pixel values stored in the first memory being stored in a second memory, wherein the stored transition values include pre-calculated transition pixel values and further wherein the transitions are transitions between bars in the video test pattern, wherein each location in the second memory corresponds to a predetermined number of pixels in a group in the first memory to select the color bar to produce; and repeating pixel values for output in regions other than the transition regions such that the repeated pixel values are repeatedly output from a same memory location.

19. The method as recited in claim 18, further comprising selecting a test pattern to render.

20. The method as recited in claim 18, further comprising selecting a video format to render.

21. A program storage device readable by machine, tangibly embodying a program of instructions executable by the machine to perform method steps as recited in claim 18.

* * * * *